United States Patent Office

3,261,791
Patented July 19, 1966

3,261,791
POLYOLEFINS STABILIZED WITH A GLYOXIME
Arthur C. Hecker, Forest Hills, Otto S. Kauder, Jamaica, and Norman L. Perry, Baldwin, N.Y., assignors to Argus Chemical Corporation, Brooklyn, N.Y., a corporation of New York
No Drawing. Filed Aug. 9, 1963, Ser. No. 301,204
14 Claims. (Cl. 260—23)

This application is a continuation-in-part of U.S. application Serial No. 239,827, filed November 23, 1962.

This invention relates to stabilizers comprising a glyoxime capable of improving the resistance of olefin polymers and particularly polypropylene to deterioration in properties when exposed to light, to polymer compositions and to a process of stabilizing olefin polymers employing such stabilizers.

Polypropylene is a tough, high-melting polymeric material, but in several respects its stability leaves much to be desired. The polymer shows a tendency to decrease rapidly in melt viscosity, and then to become brittle, when kept at elevated temperatures for the time required in milling, calendering, extrusion, injection molding and fiber-forming equipment. This deterioration is particularly serious when the polymer is worked in the molten state in the presence of oxygen, e.g., air. Polypropylene is also subject to deterioration in physical properties when exposed to light, particularly to ultraviolet light or sunlight, over long periods of time, and after such exposure has very poor resistance to heat. Shaped polymers show a tendency to discolor, to become distorted, to crack, and to powder around the edges upon exposure to sunlight and during aging, and especially when heated at moderately elevated temperatures as in an accelerated aging process, and again, the problem is accentuated in the presence of oxygen. In many cases, it is thought this is due to residual metal catalyst which is quite difficult to remove from the polymer.

In accordance with the instant invention, a stabilizer is provided comprising a glyoxime which improves the resistance to light-induced deterioration of olefin polymers, such as propylene polymers, and in combination with other olefin polymer heat and/or light stabilizers, improves resistance to light and to both heat and light-induced deteriorations, for long periods of time, as evidenced by observation of melt index, or mechanical properties or residual heat stability after exposure to light. A preferred combination in accordance with the invention comprises a glyoxime and a 2-hydroxy benzophenone. Such combinations display a more effective stabilizing action against light-induced deterioration than either alone, suggesting that each component synergizes the stabilizing action of the other.

Purity of propylene polymers, extent of degradation, and resistance to embrittlement over long periods of time are characteristics capable of evaluation by observation of the change in melt index of the particular polymer. There is a direct correlation between the rate of increase in melt index and the rate of deterioration in the above-mentioned physical properties of the polymer. Glyoximes significantly reduce the rate of increase in melt index under exposure to light, and also improve retention of color and other important properties of the polymer.

The glyoximes in accordance with the invention are vicinal dioximes in which the oxime groups are adjacent, and can be defined by the following formula:

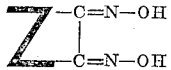

In this formula Z represents two hydrogens, or two monovalent organic aliphatic, aromatic and non-aromatic alicyclic hydrocarbon or heterocyclic radicals having from one to about thirty carbon atoms, or one bivalent organic aliphatic, aromatic or non-aromatic alicyclic hydrocarbon or heterocyclic radical having from three to about thirty carbon atoms, and in all cases the oxime groups C=NOH are adjacent.

As typical Z radicals there can be mentioned methyl, ethyl, propyl, isopropyl, butyl, sec-butyl, tert-butyl, isoamyl, hexyl, octyl, isooctyl, 2-ethyl hexyl, nonyl, octadecyl, behenyl, palmityl, lauryl, oleyl, linoleyl, ricinoleyl, phenyl, naphthyl, benzyl, α-phenethyl, β-phenethyl, xylyl, tolyl, cycloheptyl, cyclohexyl, cyclopentyl, and furyl, tetramethylene, trimethylene and 2,2'-biphenylene and 1,8-naphthalene.

Exemplary glyoximes are glyoxime, methyl glyoxime, dimethyl glyoxime, methyl isopropyl glyoxime, methyl hexadecyl glyoxime, dinonyl glyoxime, octyl carbomethoxyheptyl glyoxime, diphenyl glyoxime, methyl phenyl glyoxime, pentamethylene glyoxime, decamethylene glyoxime, tetramethylene glyoxime, di-2-furyl-glyoxime, di-n-tridecyl glyoxime, phenyl 4-methoxyphenyl glyoxime, di(2,4,6-trimethyl phenyl) glyoxime, di-1-naphthyl glyoxime, and di-(6-methyl-2-quinolyl) glyoxime. The aliphatic and non-aromatic alicyclic glyoximes are preferred.

Glyoximes are readily prepared by reaction of the corresponding diketone with excess hydroxylamine acetate. This is a known reaction, and forms no part of the instant invention.

The glyoximes of the invention are effective light stabilizers when used with olefin polymers, and especially propylene polymers, as the sole stabilizer. Their effectiveness is particularly evidenced by an improved resistance to an increase in melt index upon exposure to sunlight for long periods of time. They can also be used in conjunction with other olefin and propylene polymer light and heat stabilizers, wherein they are effective in supplementing the stabilizing effects contributed by the other stabilizers without disadvantageously affecting the desirable properties of the polymer. In many cases, an enhanced or synergistic effect is observed.

As indicated, stabilizer compositions containing a glyoxime and a 2-hydroxy benzophenone or derivative thereof are preferred for light stabilization. A benzophenone is effective that has a 2-hydroxy-benzophenone nucleus, i.e., a nucleus of the structure

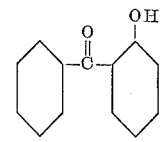

This nucleus is inclusive of the compound 2-hydroxy benzophenone, and derivatives thereof bearing substituent groups attached to any of the ring carbon atoms of the nucleus.

The preferred benzophenones of this invention, containing a nucleus of the above structure, having the following formula:

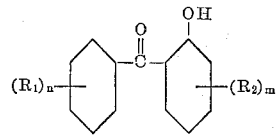

wherein $n$ is an integer from 1 to 5 and $m$ is an integer from 1 to 4 and the R radicals are selected from the group consisting of hydroxyl, halogen (such as fluorine, chlorine, bromine and iodine, and preferably chlorine or bromine) and organic radicals are selected from the group consisting of aliphatic, alicyclic, and heterocyclic groups of from one to thirty carbon atoms. However, there is no upper limit, other than impracticability, on the number of R carbon atoms. Typical R-radicals are alkyl, alkenyl, alkynyl, cycloalkyl, acyl, aryl, alkaryl, aralkyl, alkoxy, aryloxy, alkaryloxy, aralkoxy, oxyalkylene, hydroxyalkyl, and hydroxyalkylene radicals, and esters thereof with organic carboxylic acids. These radicals may, if desired, contain inert, nonreactive substituents such as halogen and other carbocyclic and heterocyclic ring structures and up to a total of three R-radicals are hydroxyl.

Within the above limitations, the R-radicals substituted on any ring or on different rings can be the same or different.

Typical organic radicals are, for example, methyl, ethyl, propyl, isopropyl, butyl, isobutyl, t-butyl, amyl, isoamyl, n-octyl, isooctyl, 2-ethylhexyl, t-octyl, decyl, tert-nonyl, tert-heptyl, undecyl, dodecyl, pentadecyl, octadecyl, tricosyl, and nonacosyl; allyl, hexenyl, linoleyl, ricinoleyl, oleyl, undecadienyl, 12-octadecenyl, propynyl, methoxy, n-butoxy, n-octyloxy, 2-ethylhexyloxy, n-decyloxy, benzyloxy, acetoxy, benzoyloxy; hexynyl, undecynyl; monochloroethyl, dichloroethyl, monobromopropyl, tribromopropyl, fluoroheptyl, chlorododecyl, chlorododecenyl, chlorododecynyl, chlorotricosyl; hydroxychlorononyl, hydroxybromodecyl, hydroxybromotricosyl; hydroxyethyl, hydroxypropyl, monohydroxyundecyl, dihydroxyundecyl, hydroxyundecenyl, hydroxyundecynyl, glyceryl, sorbityl, pentaerythrityl, and polyoxyalkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid substituted, if desired, with nonreactive groups, such as halogen, sulfur and hydroxyl. By the term "alicyclic" it will be understood that there is intended any cyclic acid in which the ring is non-aromatic and composed solely of carbon atoms, and such acids may if desired have inert, nonreactive substituents such as halogen, hydroxyl, alkyl radicals, alkenyl radicals and other carbocyclic ring structures condensed therewith. Exemplary of such acids are acetic, propionic, butyric, valeric, hexanoic, ethylheptanoic, n-octanoic, isooctanoic, capric, undecanoic, lauric, myristic, palmitic, stearic, oleic, ricinoleic, behenic; chlorocaproic and hydroxycapric acids.

As typical examples of benzophenones that are intended to be included within the scope of this invention may be mentioned the following: 2-hydroxy benzophenone, 2-hydroxy - 4 - parabromo-benzophenone, 2-hydroxy-4-methyl-benzophenone, 2,4-dihydroxy-4'-tertiarybutyl-benzophenone, 2,4,4'-trihydroxy-benzophenone, 2-hydroxy-4-methoxy - 4' - tertiary-butylbenzophenone, 2-hydroxy-4-decyloxy-benzophenone, 2 - hydroxy-4-heptyloxy-3',4'-dimethyl-benzophenone, 2,2'-(dihydroxy-4-(2-ethylhexyloxy) benzophenone, 2-hydroxy-4-benzyloxy-4'-tertiary butyl-benzophenone, 2-hydroxy-4,4'-dimyristoyloxy-benzophenone, 2-hydroxy-4-(o-chlorobenzoyloxy) benzophenone, 2-hydroxy-4-iodo-benzophenone, 2-hydroxy-4-(pentachloro - benzyloxy) benzophenone, 2 - hydroxy-4-benzyloxy - benzophenone, 2 - hydroxy - 4, 5-dimethyl-benzophenone, 2 - hydroxy - 4 - benzyloxy-5-chlorobenzophenone, 2-hydroxy-5-hexyl-2',4'-dimethylbenzophenone, 2 - hydroxy - 4 - (3,4-dichlorobenzyloxy)-4'-t-butylbenzophenone, 2 - hydroxy-3-methyl-4'-nitrobenzophenone, 2-hydroxy-(4-hexyl) - benzophenone, 2-hydroxy-4-benzyloxy-2',4',5'-trichlorobenzophenone, 2-hydroxy-(4-ethyl)-3'-chlorobenzophenone, 2,4 - dihydroxy - benzophenone, 2,2',4'-trihydroxybenzophenone and 4-n-decyloxy-2,2'-dihydroxybenzophenone.

Also useful are the 2,4,6-derivatives of 1,3,5-trithiane containing hydroxyl groups having a phenolic character

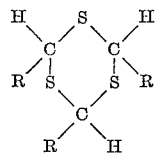

R may represent, for example:

(1) 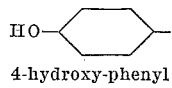

4-hydroxy-phenyl (2) 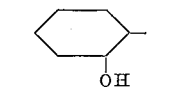

2-hydroxy-phenyl (3) 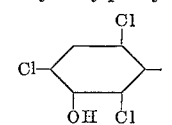

2,4,6-trichloro-3-hydroxy-phenyl (4) 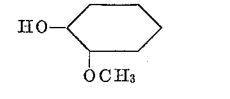

4-hydroxy-3-methoxyphenyl (5) 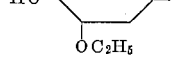

4-hydroxy-3-ethoxyphenyl (6) 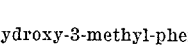

6-hydroxy-3-methyl-phenyl (7) 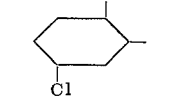

2-hydroxy-5-chlorophenyl

The o-hydroxy-phenylbenzotriazoles also can be used. These have the formula:

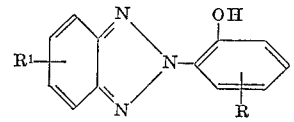

wherein R and R' are selected from the group consisting of hydrogen, hydrocarbon and oxyhydrocarbon radicals.

In the formula, the permissible R and R' substituents are numerous and varied. R and R', as stated, may each be hydrogen, in which case the compound is o-hydroxy-phenylbenzotriazole, or each may be a hydrocarbon or oxyhydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxyhydrocarbon radicals are methoxy, ethoxy, propoxy, isopropoxy and the like.

Exemplary are: 2-(2-hydroxy-5-methylphenyl) benzotriazole, 5,6-dichloro-2-(2-hydroxy-5-tertiary-butylphenyl) benzotriazole, 5-methyl-2-(2-hydroxy-3,5-dichlorophenyl) benzotriazole.

The 1-dioxides of α,β-benzoisothiazolone or saccharine can also be used:

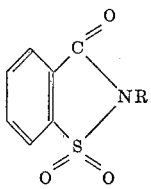

where R is hydrogen or an alkyl, aryl or alkylaryl group of from one to twelve carbon atoms, such as 2-methyl saccharine, 2-ethyl saccharine, 2-dodecyl saccharine, and 2-phenyl saccharine.

The alkyl styryl ketones also are satisfactory. These have the formula:

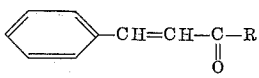

where R is an alkyl or aryl radical having from one to eight carbon atoms, such as benzalacetone, ethyl styryl ketone, and 2,4-dihydroxyphenyl styryl ketone.

The 2-hydroxy aryl-1,3,5-triazines are useful. These have the formula:

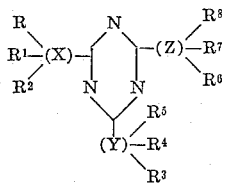

in which X, Y and Z are each an aromatic radical, each containing up to three nuclei of six carbon atoms, for example, phenyl, naphthyl or biphenyl, X being substituted by a hydroxy group ortho with respect to the point of attachment to the triazine nucleus, R, $R^1$, $R^2$, $R^3$, $R^4$, $R^5$, $R^6$, $R^7$ and $R^8$ are hydrogen, hydroxyl (preferably in the 2-, 4- and/or 5-position of the aromatic nucleus) alkyl (for example, methyl, tertiary-butyl, cyclohexyl, tertiary-octyl, n-octyl and dedecyl), alkoxy (for example, methoxy, n-butoxy, 2-ethylhexyloxy or n-octyloxy, sulfonic or carboxylic acid groups), halogen (for example, iodine, chlorine or bromine), haloalkyl (for example, dichloromethyl or trifluoromethyl), alkylamido (for example, acetamido), mono cyclic arylamide (for example, benzamide and lower mono-cyclic aryl lower alkyl amides, such as phenylacetamido). Exemplary are:

2,4,6-tris-(2-hydroxy-4-octyloxyphenyl)-triazine-s;
2,4,6-tris-(2,4-dihydroxyphenyl)-triazine-s;
2,4,6-tris-(2-hydroxy-4-propylphenyl)-triazine-s;
2,4,6-tris-(2-hydroxy-5-methylphenyl)-triazine-s;
2,4-bis-(2,4-dichlorophenyl)-6-(o-methoxyphenyl)-triazine-s;
2,4-bis-(2,4-dihydroxyphenyl)-6-(o-hydroxyphenyl)-triazine-s;
2-(2,4-dimethylphenyl)-4-(2,4-dihydroxyphenyl)-6-(o-hydroxyphenyl)-triazine-s;
2,4,6-tris-(2-hydroxynaphthyl-1)-triazine-s;
2,4,6-tris-(o-hydroxyphenyl)-triazine-s;
2,4-(2-hydroxy-5-carboxyphenyl)-6-(o-hydroxyphenyl)-triazine-s;
2,4,6-tris-(2-hydroxy-5-chloro)-triazine-s;
2,4,6-tris-(2,4-dihydroxy-6-hexylphenyl)-triazine-s;
2-(2,4-dihydroxyphenyl)-4,6-diphenyl-triazine-s;
2-(o-hydroxyphenyl)-4,6-bis(4-methoxyphenyl)-triazine-s;
2,4,6-tris(2,4-dimethoxyphenyl)-triazine-s, and
2,4-bis(2-hydroxy-4-methoxyphenyl)-6-(2,4-dimethoxyphenyl)-triazine-s;
2,4-bis-(2,4-dihydroxyphenyl)-6-(4-methoxyphenyl)-triazine-s.

The dialkylhydroxybenzoic acid derivatives are useful. These have the formula:

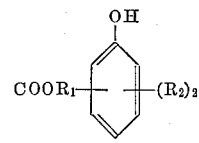

in which $R_1$ is hydrogen or an aryl, alkyl or alkaryl radical, having from one to eighteen carbon atoms, and each $R_2$ is an alkyl radical and at least one R radical has a branched chain at an α-carbon atom, as for example in a secondary or tertiary alkyl radical. Preferably, each R has from three to eight carbon atoms. Exemplary are:

3-methyl-5-isopropyl-4-hydroxybenzoic acid,
3-ethyl-5-tertiary-butyl-4-hydroxybenzoic acid,
3-pentyl-5-tertiary-octyl-4-hydroxybenzoic acid,
t-octylphenyl salicylate,
n-dodecylphenyl salicylate,
t-butylphenyl-5-t-butyl salicylate,
nonylphenyl 5-chloro salicylate.

The preferred stabilizers are those in which each R substituent has a branched chain at the α-carbon atom. Exemplary are:

3,5-diisopropyl-4-hydroxybenzoic acid,
3-isopropyl-5-tertiary-butyl-4-hydroxybenzoic acid,
3,5-di-tertiary-butyl-4-hydroxybenzoic acid,
3-cyclohexyl-5-tertiary-butyl-4-hydroxybenzoic acid,
3,5-dicyclohexyl-5-tertiary-butyl-4-hydroxybenzoic acid,
3,5-dicyclopentyl-4-hydroxybenzoic acid,
3,5-di-tertiary-octyl-4-hydroxybenzoic acid.

The most preferred compounds are those in which each R is a tertiary alkyl with at most eight carbon atoms, for example, 3,5-di-tertiary-butyl-4-hydroxybenzoic acid.

The triazines having the following formula can also be employed:

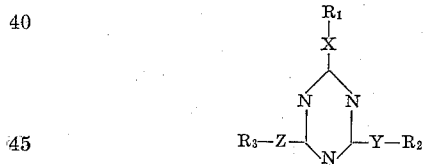

where $R_1$ and $R_2$ represent an alkyl group of from one to eighteen carbon atoms, for example, methyl, ethyl, propyl, butyl, pentyl, octyl, dodecyl and octadecyl, a cycloalkyl group of five to six carbon atoms, for example, cyclopentyl or cyclohexyl, a phenyl group or an alkyl phenyl group of from seven to twenty-four atoms, for example, methylphenyl, ethylphenyl, butylphenyl, octylphenyl, octadecylphenyl, dimethylphenyl, dibutylphenyl and dioctadecylphenyl, an alkoxyalkyl group of from three to fifteen atoms, for example, methoxymethyl, ethoxyethyl, butoxyethyl, n-lauryloxyethyl, or an alkoxyphenyl group of from eight to nineteen carbon atoms, for example, methoxyphenyl, ethoxyphenyl, n-octyloxyphenyl or n-lauryloxyphenyl. $R_3$ designates an alkyl hydroxyphenyl of from seven to twenty-four carbon atoms, for example, methylhydroxyphenyl, ethylhydroxyphenyl, butylhydroxyphenyl, octylhydroxyphenyl, octadecylhdroxphenyl, di-t-butylhydroxyphenyl, methyl-di-t-butylhydroxyphenyl. X, Y and Z each designate a sulfur or oxgen atom or a substituted or unsubstituted imino group, preferably arylalkyl imino, for example, benzylimino.

An additional class of triazines has the formula:

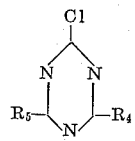

in which $R_4$ represents an alkylhydroxyanilino group, preferably one having seven to twenty-four carbon atoms, for example methylhydroxyanilino, ethylhydroxyanilino, butylhydroxyanilino, octylhydroxyanilino, dodecylhydroxyanilino, octadecylhydroxyanilino, di-t-butylhydroxyanilino and methyl-di-t-butylhydroxyanilino, or an alkyl thioalkoxy group, preferably having from one to eighteen carbon atoms, for example, thiomethyl, thioethyl, thiopropyl, thiobutyl, thiooctyl, thiododecyl and thiooctadecyl, and $R_5$ represents an alkylhydroxyaniline group, preferably one corresponding to the definition of $R_4$.

Exemplary compounds coming within one or both of the above triazine formulae are 6-(4-hydroxy-3,5-di-t-butylanilino)-2,4-bis-(n-thiooctyl)-1,3,5-triazine;
6-(4-hydroxy-3,5-di-t-butylanilino)-2,4-bis-thiophenyl-1,3,5-triazine;
6-(4-hydroxy-3,5-di-t-butylanilino)-2,4-bis-thiooctadecyl-1,3,5-triazine;
6-(4-hydroxy-3,5-di-t-butylanilino)-2,4-bis-thio-cyclohexyl-1,3,5-triazine;
6-(2-hydroxy-3,5-di-t-butyl-6-methylanilino)-2,4-bis-(n-thiooctyl)-1,3,5-triazine;
6-(4-hydroxy-3,5-di-t-butylanilino)-4-n-thiooctyl-2-chlor-1,3,5-triazine;
4,6-bis-(4-hydroxy-3,5-di-t-butyl-anilino)-2-chlor-1,3,5-triazine.

Additional stabilizers which can be used include:
Hydroxyethyl ethylene diamine triacetic acid,
Nitrilotriacetic acid,
Ethylene diamine tetraacetic acid,
2,4,6,-tris-2-hydroxyphenyl-1,3,5-trithiane,
2,4,6,-tris-2-hydroxyphenyl-1,3,5-triazine,
2,4-dihydroxyphenyl furyl ketone,
2,2'-dihyproxy-4,4'-diethoxybenzil,
2-hydroxy benzaldehyde bis(n-dodecylmercaptal),
Tri-n-dodecyl-phosphoramide, tri-cyclohexyl-phosphoramide,
Hexamethyl-phosphoramide,
Octamethyl-pyrophosphoramide, 2-cyano-3-p-dodecylanilino acrylonitrile,
2-ethylhexyl(2-cyano-3-N-methylanilino)acrylate,
Oxalic acid, oxanilide, p-ethoxy-oxanilide,
N,N'-diethyldithioxamide,
N,N'-di-n-dodecyldithio oxamide,
N,N'-di-cyclohexyldithio oxamide,
N,N'-diamino oxamidine salts (acetate, benzoate, phosphate),
N,N'-dianilino oxamidine,
2-ethylhexyl(4-hydroxy-3,5-di-tertiary-butyl-α-cyano-cinnamate,
n-Butyl-(β-phenyl-α-cyano-cinnamate),
2-(4-hydroxy 3-methylphenyl) benzotriazole oxide.

Additional heat stabilizers which can be used include, for instance, phenols, organic triphosphites, thiodipropionic esters, polyvalent metal salts of organic acids, organic mercaptans, and organic polysulfides.

When the glyoxime is used in conjunction with a phenol the increased stabilizing effect is evidenced by improved resistance to yellowing, and an extended life, in terms of resistance to embrittlement and development of tackiness at elevated temperatures. The phenol stabilizers contain one or more phenolic hydroxyl groups, and can contain one or more phenolic nuclei. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one, or in the same or different rings, if there are more than one. In the case of bicyclic phenols, the rings can be linked by thio or oxyether groups, or by alkylene, alicyclidene or arylidene groups. Such phenols, which are preferred because of their superior stabilizing action, can be defined by the formula:

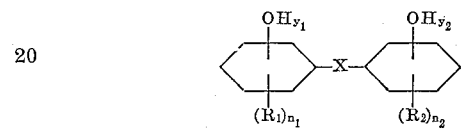

where X is an oxygen or sulfur atom, or an alkylene or alicyclidene or arylene or a mixed alkylene-alicyclidene or alkylene-arylidene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are

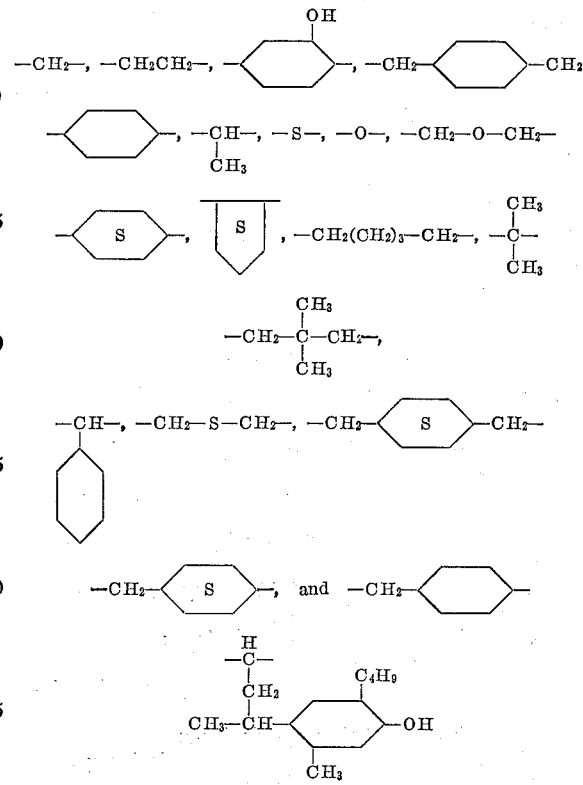

The various X and R groups are exemplified in the following compounds.

Exemplary of satisfactory monohydric phenols are 2,6-di-tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are

Orcinol,
Propyl gallate,
Catechol,
Resorcinol,
4-octyl resorcinol,
4-dodecyl resorcinol,
4-octadecyl catechol,
4-isooctyl-phloroglucinol,
Pyrogallol,
Texahydroxy benzene,
4-isohexyl-catechol,
2,6-di-tertiary-butyl resorcinol,
2,6-diisopropyl phloroglucinol,
Methylenebis(2,6-ditertiarybutyl-m-cresol),
Methylenebis(2,6-ditertiarybutyl-phenol),
2,2-bis(4-hydroxyphenyl) propane,
Methylenebis(p-cresol),
4,4'-thio-bis-phenol
4,4'-oxobis(3-methyl-6-isopropyl-phenol),
4,4'-thiobis(3-methyl-6-tertiarybutyl-phenol),
2,2'-oxobis(4-dodecyl-phenol),
2,2'-thiobis(4-methyl-6-tertiary-butyl-phenol),
2,6-diisooctyl resorcinol,
4,4'-n-butylidenebis(2-tertiarybutyl-5-methyl-phenol),
4,4'-benzylidenebis(2-tertiarybutyl-5-methyl-phenol),
2,2'-methylenebis(4-methyl-6-(1'-methyl-cyclohexyl) phenol),
4,4'-cyclohexylidenebis(2-tertiarybutyl-phenol),
2,6-bis(2'-hydroxy-3-tertiary-butyl-5'-methylbenzyl)-4-methylphenol,
4-octyl pyrogallol, and
3,5-dietertiarybutyl catechol.

The triphosphite can be any organic triphosphite having attached to phosphorus through oxygen or sulfur groups selected from aryl, alkyl, cycloalkyl, aralkyl and alkaryl groups, in any combinations, such as, three monovalent groups, $(RA)_3P$; one monovalent group and one bivalent group, forming a heterocyclic ring with the phosphorus,

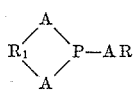

a plurality of bivalent groups forming polymers therewith,

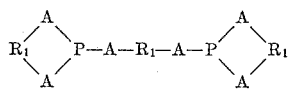

one trivalent group,

and a plurality of trivalent groups forming polymers therewith,

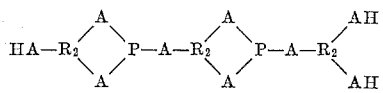

and any combinations of monovalent, bivalent and trivalent groups to form monomeric and polymeric phosphites; wherein A is oxygen or sulfur. The term "organic phosphite triester" as used herein is inclusive of oxo, thio and mixed oxo thio phosphites. Usually, the phosphite will not have more than about sixty carbon atoms.

Exemplary are

Monophenyl di-2-ethyl hexyl phosphite,
Diphenyl mono-2-ethyl hexyl phosphite,
Diisooctyl monotolyl phosphite,
Tri-2-ethyl hexyl phosphite,
Phenyl dicyclohexyl phosphite,
Phenyldiethyl phosphite,
Triphenyl phosphite,
Tricresyl phosphite,
Tri(dimethylphenyl) phosphite,
Trioctadecyl phosphite,
Triisooctyl phosphite,
Tridodecyl phosphite,
Isooctyl diphenyl phosphite,
Diisooctyl phenyl phosphite,
Tri(t-octylphenyl) phosphite,
Tri(t-nonylphenyl) phosphite,
Benzyl methyl isopropyl phosphite,
Butyl dicresyl phosphite,
Isooctyl di(octylphenyl) phosphite,
Di(2-ethylhexyl)(isooctylphenyl) phosphite,
Tri(2-cyclohexylphenyl) phosphite,
Tri-α-naphthyl phosphite,
Tri(phenylphenyl) phosphite,
Tri(2-phenyl ethyl) phosphite,
Tridodecyl thiophosphite,
Tri-p-tert-butyl phenyl thiophosphite,
Didecyl thiodiphenyl phosphite,
Tert-butyl phenyl thio-di-2-ethylhexyl phosphite,
Ethylene phenyl phosphite,
Ethylene t-butyl phosphite,
Ethylene isohexyl phosphite,
Ethylene isooctyl phosphite,
Ethylene cyclohexyl phosphite,
2-phenoxy-1,3,2-dioxaphosphorinane,
2-butoxy-1,3,2-dioxaphosphorinane,
2-octoxy-5,5-dimethyldioxaphosphorinane, and
2-cyclohexyloxy-5,5-diethyldioxaphosphorinane.

When the glyoxime stabilizer is used in conjunction with a thiodipropionic acid ester, the improvement is evidenced by a materially prolonged resistance to embrittlement and development of tackiness at elevated temperatures. The thiodipropionic acid ester has the following formula:

$$R_1OOCCH_2CH_2—S—CH_2CH_2COOY$$

in which $R_1$ is an organic R radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

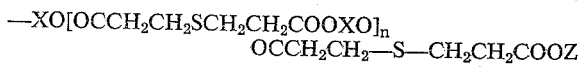

where Z is hydrogen, $R_2$ or M; $n$ is the number of thiodipropionic acid ester units in the chain; and X is a bivalent hydrocarbon group of the type of $R_1$ that is, alkylene, alkenylene, arylene, cycloalkylene, mixed alkyl arylene and mixed alkyl cycloalkylene radicals; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-mentioned categories within the general formula can be defined as follows:

(a) 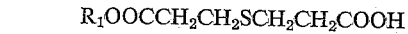

(b) 

(c) $R_1O[OCCH_2CH_2SCH_2CH_2COOX$
$\qquad\qquad —O]_nOCCH_2CH_2SCH_2CH_2COOZ$ (d) $[R_1OOCCH_2CH_2SCH_2CH_2COO]_2M$ In the above formulae $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

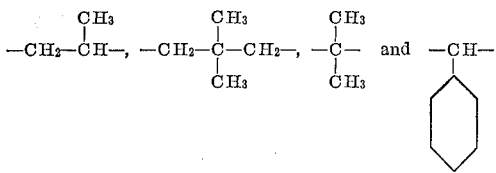

arylene radicals such as phenylene,

methylenephenylene,

dimethylene phenylene,

and alicyclene radicals such as cyclohexylene,

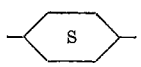

and cyclopentylene

As exemplary of the thiodipropionic acid esters which can be used, there can be mentioned the following: mono-lauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the glyoxime is used in conjunction with a polyvalent metal salt of an organic acid, the polyvalent metal salt of an organic acid will ordinarily have from about six to about twenty-four carbon atoms. The polyvalent metal can be any metal of Group II of the periodic table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The preferred stabilizer system of the invention comprises four or five stabilizers, the glyoxime, a polyhydric phenol, a triphosphite, and a thiodipropionic acid ester and optionally, a 2-hydroxy-benzophenone. An additional sixth ingredient which is included in the preferred systems of the invention, but which is not essential, is a polyvalent metal salt of an organic acid. These five and six stabilizers together give an enhanced stabilization which is not obtainable from any of them alone or in combinations of two or three. When taken alone, the components of this stabilizer system are capable only of inhibiting deterioration in one or two respects, and quite large amounts may be needed before any effect is noted. The components other than the glyoxime in pairs may display a lesser stabilizing effect than any one alone. For example, the phenol alone gives an improved resistance to embrittlement and reduction in melt viscosity at elevated temperatures, but little assistance as to maintenance of color. The triphosphite alone is a rather poor stabilizer in preventing deterioration in the first two properties, but it does assist in resisting discoloration.

The thiodipropionic acid ester by itself only improves resistance to embrittlement. The polyvalent salt of an organic acid by itself prevents discoloration, but no more. In combination with the phenol, the color is worse than with the salt alone.

In combinations with the triphosphite, the usual discoloration is prevented, but black spots may be obtained upon aging at high triphosphite concentrations.

In view of this, it is surprising that the glyoxime, phenol, triphosphite and thiodipropionic acid ester taken together in the same total amount not only prevent discoloration but also embrittlement and inhibit the increase in melt index, with accompanying degradation of physical properties, both upon exposure to light and at processing temperatures, and furthermore greatly enhance the resistance to discoloration and embrittlement on aging to far beyond that obtainable from the components individually. This enhanced stabilizing effect is obtained with any olefin polymer, regardless of the process by which it is prepared.

A very small amount of the glyoxime is sufficient, with or without additional stabilizers, to improve the stability against deterioration in physical properties, including, for example, resistance to embrittlement, upon exposure to light under the conditions to which the olefin polymer will be subjected. Amounts within the range from about 0.005 to about 5% by weight of the polymer impart satisfactory resistance. Preferably, from 0.01 to 1% is employed for optimum stabilization.

If additional stabilizers are employed to obtain additional stabilization effects, the amount of total stabilizer is within the range from about 0.005 to about 5%, preferably from 0.1 to 3%.

Preferably, the stabilizer system comprises from about 0.01 to about 1% of glyoxime, from about 0.025 to about 0.5% of a phenol, and from about 0.05 to about 1% of a thiodipropionic acid ester, with, optionally, from about 0.025 to about 0.75% of a polyvalent metal salt, when present, and from about 0.05 to about 0.5% of a 2-hydroxy-benzophenone, when present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

The stabilizer of the invention is applicable to olefin polymers prepared by any of the various procedures, using the available catalysts, such as the Ziegler, ICI, Union Carbide, Du Pont, Phillips, Montecatini, Esso and Standard Oil (Indiana) process polymers (Chem. & Eng. News, November 21, 1960, pp. 36–59), for the molecular weight and tacticity are not factors affecting this stabilizer.

Olefin polymers prepared by these processes contain traces of catalyst residues. These residues materially diminish the stability of the olefin polymer, despite efforts to overcome the problems by addition of polyvinyl chloride resin stabilizers, whose function was to act on the halogen or halide of the catalyst in the same manner as on the halogen or liberated halide of the polyvinyl chloride resin. It is now customary to remove catalyst residues substantially completely, so that the addition of polyvinyl chloride resin stabilizers is no longer indicated. The stabilizers of the invention are effective, however, with any olefin polymers, whether containing or substantially free from catalyst residues.

Polypropylene solid polymer can be defined in a manner to differentiate it from other polyolefins as having a density within the range of from 0.86 to 0.91, and a melting point above 150° C. The stabilizer of the invention is applicable to all such polypropylenes as distinguished from polypropylenes in the liquid form or in semiliquid or gel-like forms such as are used as greases and waxes.

Isotactic polypropylene, available commercially under the trade names Pro-Fax, Escon and Olefane and having a softening or hot-working temperature of about 350° F. is an example of a sterically regular polypropylene polymer.

Mixtures of olefin polymers, such as propylene polymers with other compatible olefin polymers, and copolymers of propylene with copolymerizable monomers such as ethylene and butene, also can be stabilized in accordance with this invention. For example, mixtures of polyethylene and polypropylene, and copolymers of propylene and ethylene which contain a sufficient amount of propylene to present the instability problem that is resolved by the stabilizer of the invention, can be stabilized by the addition of a glyoxime, alone or in combination with other propylene polymer stabilizers.

The stabilizers of the invention can also be used with low density polyethylene, Ziegler polyethylene, high density polyethylene, poly(butene-1), poly(pentene-1), poly-(3-methylbutene-1), poly-4-methyl-pentene-1, and polystyrene.

The stabilizer is incorporated in the polymer in suitable mixing equipment, such as a mill or a Banbury mixer. If the propylene polymer has a melt viscosity which is too high for the desired use, the propylene polymer can be worked until its melt viscosity has been reduced to the desired range before addition of the stabilizer. However, propylene polymers in a range of workable melt viscosities are now available. Mixing is continued until the mixture is substantially uniform. The resulting composition is then removed from the mixing equipment and brought to the size and shape desired, for marketing or use.

The stabilizing effect of the glyoximes of the invention was evaluated in the working examples which follow using the Weatherometer at 52° C. black panel temperature and examined at intervals for ability to withstand cracking by bending.

EXAMPLES 1 to 3

In accordance with this invention, the glyoxime and benzophenone listed in the table which follows were weighed and dispersed by hand stirring in 100 parts of powdered previously unstabilized polypropylene (Pro-Fax 6501) together with dilauryl thiodipropionate, zinc 2-ethyl hexoate, and the product of the transesterification of one mole of diisooctyl phenyl phosphite, 0.5 mole of 4,4'-n-butylidene-bis-(2-tert-butyl-5-methyl-phenol), 2 moles of tridecyl alcohol, and 0.9 g. of sodium hydroxide at 110 to 170° C. for 3 hours. This polymer as supplied had a melt index of 3.0, ASTM D1238–57T at 230° C.

The mixture so prepared was in each case placed on a 2-roll mill and fluxed for five minutes at 170±2° C. 20 mil slabs were then molded from each test composition, and exposed to light and air in the Weatherometer.

*Table I*

| Example No | Control A | Control B | 1 | 2 | 3 |
| --- | --- | --- | --- | --- | --- |
| Pro-Fax 6501 | 100 | 100 | 100 | 100 | 100 |
| 2-hydroxy-4-decoxy benzophenone | 0.3 | 0.6 | 0.3 | 0.3 | 0.3 |
| Dilauryl thiodipropionate | 0.25 | 0.25 | 0.25 | 0.25 | 0.25 |
| Zinc 2-ethylhexoate | 0.06 | 0.06 | 0.06 | 0.06 | 0.06 |
| Product of the transesterification of diisooctyl phenyl phosphite and 4,4'-n-butylidene-bis-(2-tert-butyl-5-methyl phenol) | 0.19 | 0.19 | 0.19 | 0.19 | 0.19 |
| Dimethyl glyoxime | | | 0.3 | | |
| Difuryl glyoxime | | | | 0.3 | |
| Octane-2,3-dioxime | | | | | 0.3 |
| Initial aging stability (hrs.) of 20 mil samples at 150° C | 785 | 895 | 1,133 | 1,309 | 1,038 |
| Aging stability (hrs.) after 100 hrs. in Weatherometer | 41 | 12.5 | 95 | 113 | 143 |
| Aging stability (hrs.) after 300 hrs. in Weatherometer | 12.5 | 12.5 | 13.5 | 41 | 18.5 |

The above data clearly indicate that the glyoxime greatly increased the resistance of the polymer to degradative deterioration, especially after prolonged exposure for 100 and 300 hours to light and air. Examples 1, 2 and 3 show that the light and heat stability were superior to the Controls A and B, the polymers stabilized by the other stabilizers but without glyoxime.

EXAMPLE 4

Polypropylene was stabilized against light deterioration solely by the addition of dimethyl glyoxime. 0.3 part of dimethyl glyoxime was weighed and dispersed by hand stirring in 100 parts of powdered previously unstabilized polypropylene (Pro-Fax 6501). This polymer as supplied had a melt index of 3.0 ASTM D1238-57T at 230° C. The mixture was placed on a 2-roll mill and fluxed for five minutes at 170±2° C. Pieces and control strips cut from a milled sheet made from the sample composition were exposed in the Weatherometer at 52° C. black panel temperature and examined at intervals for ability to withstand cracking when bent. Failure was determined as the time when the piece cracked when bent.

*Table II*

Example No.: Hours to failure
Control (no glyoxime) _____ 90
Example 4 (with dimethyl glyoxime) _____ 200

The data of Table II clearly indicates that the addition of the glyoxime markedly improved the resistance of the polymer to degradation due to exposure to light.

EXAMPLE 5

The polypropylene of Examples 1 to 3 was stabilized by addition of dimethyl glyoxime and bis(p-tert-octyl phenol) sulfide as an additional stabilizer in accordance with this invention, in the amounts shown in Table III. The stabilizers were weighed and dispersed by hand stirring in the polypropylene. The mixture was placed on a 2-roll mill and fluxed for five minutes at 170±2° C. Strips of each sample composition were exposed in the Weatherometer at 52° C. black panel temperaure and examined at intervals for ability to withstand cracking by bending. The heat stability was determined at 150° C. The results appear in Table III.

*Table III*

| Example No | Control A | Control B | 5 | 6 |
| --- | --- | --- | --- | --- |
| Pro-Fax 6501 | 100 | 100 | 100 | 100 |
| 2-hydroxy-4-decoxy benzophenone | 0.3 | 0.3 | | 0.3 |
| Dilauryl thiodipropionate | 0.25 | 0.25 | 0.25 | 0.25 |
| Zinc 2-ethyl hexoate | 0.06 | 0.06 | 0.06 | 0.06 |
| Trinonylphenyl phosphite | 0.22 | 0.22 | 0.22 | 0.22 |
| 1,1,3-tris-(2'-methyl-4'hydroxy-5'-tertiary butyl phenyl)butane | 0.03 | 0.03 | 0.03 | 0.03 |
| Dimethyl glyoxime | | 0.3 | 0.3 | 0.3 |
| Bis(p-tert-octyl phenol) sulfide | | | 0.3 | 0.3 |
| Initial aging stability (hrs.) of 20 mil samples at 150° C | 785 | 1,133 | 1,206 | 1,206 |
| Aging stability (hrs.) after 100 hours in Weatherometer | 41.0 | 95 | 89 | 182 |
| Aging stability (hrs.) after 200 hours in Weatherometer | 18.5 | 72 | 65 | 182 |
| Aging stability (hrs.) after 300 hours in Weatherometer | 12.5 | 18.5 | 18.5 | 95.0 |
| Crack test (in hours) | 477 | 477 | 448 | 477 |

The data of Example 5 Table III clearly indicate that the addition of the bisphenol sulfide as additional stabilizer to a polypropylene resin stabilized with a glyoxime stabilizer of this invention and heat stabilizers markedly improves the resistance of the polymer to degradation due to exposure to light and heat. The addition of a further light stabilizer (Example 6) gives an additional improvement.

EXAMPLES 7 to 8

Polypropylene (ProFax 6501) was stabilized by the addition of di-(2-furyl)glyoxime. The stabilizer was weighed and dispersed by hand stirring in 100 parts of the polypropylene. The polymer as supplied had a melt index of 3.0 ASTM D1238-57T at 230° C. The mixture was in each case placed on a 2-roll mill and fluxed for five minutes at 170±2° C. Pieces cut from the milled sheet were placed in a 6" x 6" x 0.04" mold and molded at 350° F., at a pressure of 1,000 p.s.i., for 5 minutes. The molded specimen was then cooled to 100° F., the pressure released and the slab so formed was removed.

In testing the polypropylene plastic so molded, the specimen was exposed to ultraviolet light and air in a Weatherometer, and then tested for heat stability at 150° C. The results are given in Table IV.

*Table IV*

| Example No | Control A | 7 | 8 |
| --- | --- | --- | --- |
| Pro-fax 6501 | 100 | 100 | 100 |
| Dilauryl thiodipropionate | 0.25 | 0.25 | 0.25 |
| Zinc 2-ethyl hexoate | 0.06 | 0.06 | 0.06 |
| Triphenyl phosphite | 0.25 | 0.25 | 0.25 |
| 2,6-bis-(2'-hydroxy-3,5-di tert nonyl benzyl) p-tert-nonyl phenol | 0.1 | 0.1 | 0.1 |
| Furyl dioxime | | 0.3 | 0.6 |
| Initial aging stability (hrs.) of 20 mil samples at 150° C | 702 | 1,205 | 1,205 |
| Aging stability (hrs.) after 100 hours in Weatherometer | 6 | 37 | 58 |
| Aging stability (hrs.) after 200 hours in Weatherometer | 4 | 10 | 10 |
| Aging stability (hrs.) after 300 hours in Weatherometer | | 6 | 6 |
| Crack test (in hours) | 200 | 350 | 350 |

The data of Table IV clearly indicate that the addition of di(2-furyl)glyoxime to a polypropylene resin markedly improves the resistance of the polymer to degradation due to exposure to light and heat.

EXAMPLES 9 to 14

In accordance with this invention dimethyl glyoxime in the amounts given in Table V which follows were weighed and dispersed by hand stirring in 100 parts of powdered previously unstabilized polypropylene (Pro-fax 6501) together with 0.25 part of dilauryl thiodipropionate, 0.06 part of zinc 2-ethylhexoate and 0.19 part of the product of the transesterification of one mole of triphenyl phosphite, 0.5 mole of 4,4'-n-butylidene-bis-(2-tert-butyl-5-methyl phenol), 2 moles of tridecyl alcohol and 0.9 g.

of sodium hydroxide at 110 to 170° C. for 3 hours. In addition, in Examples 12 to 14, 0.3 part of 2-hydroxy-4 octoxy benzophenone was added. This polymer as supplied had a melt index of 3.0 ASTM D1238–57T at 230° C. The mixture so prepared was in each case placed on a 2-roll mill and fluxed for five minutes at 170±2° C. Pieces cut from the milled sheet were exposed to sunlight at the Desert Sunshine Exposure Test Station at Phoenix, Arizona, for a test period of seven months. They were examined at intervals for ability to withstand cracking by bending, and melt index also was determined, using a modified ASTM D1238–57T test procedure for determining melt index, using a 2160 g. weight load on the plastometer piston, comparing melt index before and after exposure of the polymer to sunlight.

Table V

| Example No. | Control A | 9 | 10 | 11 | 12 | 13 | 14 |
|---|---|---|---|---|---|---|---|
| Pro-fax 6501 | 100 | 100 | 100 | 100 | 100 | 100 | 100 |
| Dilauryl thiodipropionate | 0.25 | 0.25 | 0.25 | 0.25 | 0.25 | 0.25 | 0.25 |
| Dimethyl glyoxime | | 0.15 | 0.3 | 0.6 | 0.15 | 0.3 | 0.6 |
| 2-hydroxy-4-octoxy-benzophenone | | | | | 0.3 | 0.3 | 0.3 |
| Zinc 2-ethylhexoate | 0.06 | 0.06 | 0.06 | 0.06 | 0.06 | 0.06 | 0.06 |
| Transesterified phenol-phosphite | 0.19 | 0.19 | 0.19 | 0.19 | 0.19 | 0.19 | 0.19 |
| Crack Test: | | | | | | | |
| 4 months | (1) | (2) | (2) | (2) | (2) | (2) | (2) |
| 7 months | (3) | (3) | (1) | (1) | (2) | (2) | (2) |
| Melt Index: | | | | | | | |
| 4 months | 66.0 | 6.57 | 11.07 | 8.88 | 3.93 | 4.23 | 5.71 |
| 7 months | | | 53.6 | 33.04 | 7.0 | 5.45 | 6.5 |

[1] Very brittle. [2] Good. [3] Disintegrated.

The data of Table V clearly indicate that the addition of a light stabilizer of this invention as additional stabilizer to a polypropylene resin stabilized with heat stabilizers markedly improves the resistance of the polymer to degradation due to exposure to light.

We claim:

1. A stabilizer combination for use in improving the resistance of olefin polymers to deterioration in physical properties on exposure to light, consisting essentially of from about 0.5 to about 500 parts by weight of a glyoxime and from about 0.5 to about 500 parts by weight of another olefin polymer stabilizer, said stabilizer being compatible with polypropylene and having a low vapor pressure at olefin polymer working temperatures.

2. A stabilizer combination in accordance with claim 1 consisting essentially of a glyoxime and a phenol.

3. A stabilizer combination in accordance with claim 1 consisting essentially of a glyoxime and a bicyclic phenol.

4. A stabilizer combination in accordance with claim 1 consisting essentially of a glyoxime and a triphosphite.

5. A stabilizer combination in accordance with claim 1 consisting essentially of a glyoxime and a metal salt of an organic non-nitrogenous monocarboxylic acid having from six to twenty-four carbon atoms and a polyvalent metal of Group II of the Periodic Table.

6. A stabilizer combination in accordance with claim 1 consisting essentially of a glyoxime and a thiodipropionate.

7. A stabilizer combination in accordance with claim 1 consisting essentially of a glyoxime and a 2-hydroxybenzophenone.

8. A stabilizer combination in accordance with claim 1 consisting essentially of a glyoxime, a phenol, a triphosphite, and a thiodipropionate.

9. A stabilizer combination in accordance with claim 1 consisting essentially of a glyoxime, a phenol, a triphosphite, a thiodipropionate, and a metal salt of an organic non-nitrogenous monocarboxylic acid having from six to twenty-four carbon atoms and a polyvalent metal of Group II of the Periodic Table.

10. A stabilizer combination in accordance with claim 1 consisting essentially of a glyoxime, a phenol, a triphosphite, a thiodipropionate, a metal salt of an organic non-nitrogenous monocarboxylic acid having from six to twenty-four carbon atoms and a polyvalent metal of Group II of the Periodic Table, and a 2-hydroxy-benzophenone.

11. An olefin polymer composition having improved resistance to deterioration upon exposure to light comprising an olefin polymer and from about 0.005 to about 5% by weight of the polymer of a glyoxime.

12. An olefin polymer composition in accordance with claim 11 in which the olefin polymer is a propylene polymer.

13. An olefin polymer composition in accordance with claim 12 in which the propylene polymer is polypropylene.

14. A propylene polymer composition having improved resistance to deterioration upon exposure to light comprising a propylene polymer, 0.005 to about 5% by weight of the polymer of a glyoxime and from about 0.005 to about 5% by weight of the polymer of another propylene polymer stabilizer, the total of the glyoxime and another polypropylene stabilizer being at most about 5% by weight of the polymer, said stabilizers being compatible with the polymer and having a low vapor pressure at propylene polymer working temperatures.

References Cited by the Examiner

UNITED STATES PATENTS

| 2,146,735 | 2/1939 | Hale | 260—45.9 |
| 2,497,061 | 2/1950 | Kellog | 260—45.9 |
| 2,861,053 | 11/1958 | Lappin et al. | 260—45.95 |

FOREIGN PATENTS

| 577,252 | 7/1959 | Belgium. |
| 608,408 | 1/1962 | Belgium. |

LEON J. BERCOVITZ, *Primary Examiner.*

R. A. WHITE, *Assistant Examiner.*

UNITED STATES PATENT OFFICE
CERTIFICATE OF CORRECTION

Patent No. 3,261,791                                            July 19, 1966

Arthur C. Hecker et al.

It is hereby certified that error appears in the above numbered patent requiring correction and that the said Letters Patent should read as corrected below.

Column 3, line 60, for "-(dihydroxy-" read -- -dihydroxy- --; column 4, lines 53 to 58, for that portion of the formula reading "$R^1$——" read -- $R'$—— --; column 7, line 35, for "-dihyproxy-" read ---dihydroxy- --; column 8, lines 49 to 51, after the formula insert the following:

column 9, line 11, for "Texahydroxy" read -- Hexahydroxy --; line 30, for "-3-" read -- -3'- --; same column 9, lines 54 to 56, the formula should appear as shown below instead of as in the patent:

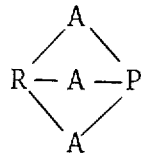

column 15, Table I, first column, line 9 thereof, for "4,4'-n-" read -- 4,4'-n'- --.

Signed and sealed this 1st day of August 1967.

(SEAL)
Attest:

EDWARD M. FLETCHER, JR.                              EDWARD J. BRENNER
Attesting Officer                                            Commissioner of Patents